US010936889B2

(12) United States Patent
Wunsche, III et al.

(10) Patent No.: US 10,936,889 B2
(45) Date of Patent: Mar. 2, 2021

(54) INTERIOR CAMERA SERVICES FOR VEHICLE-SHARING FLEET

(71) Applicants: DENSO International America, Inc., Southfield, MI (US); DENSO CORPORATION, Kariya (JP)

(72) Inventors: Robert Wunsche, III, Clarkston, MI (US); Mustafa Mahmoud, Northville, MI (US); Thomas Newman, Livonia, MI (US); Feng Xue, Novi, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/676,917

(22) Filed: Nov. 7, 2019

(65) Prior Publication Data

US 2020/0151476 A1    May 14, 2020

Related U.S. Application Data

(60) Provisional application No. 62/812,049, filed on Feb. 28, 2019, provisional application No. 62/760,613, filed on Nov. 13, 2018.

(51) Int. Cl.
*G06K 9/00* (2006.01)
*B60R 22/48* (2006.01)
*B60R 11/04* (2006.01)

(52) U.S. Cl.
CPC ......... *G06K 9/00845* (2013.01); *B60R 11/04* (2013.01); *B60R 22/48* (2013.01);
(Continued)

(58) Field of Classification Search
CPC ........... G06K 9/00845; G06K 9/00335; G06K 9/00221; G06K 9/00832; B60R 11/04;
(Continued)

(56) References Cited

U.S. PATENT DOCUMENTS 7,467,883 B2 * 12/2008 DeLine ................ B60Q 1/2665
                                                     362/494
2013/0070043 A1 *  3/2013 Geva .................... B60K 28/066
                                                     348/14.02
(Continued)

OTHER PUBLICATIONS

International Search Report regarding International Application No. PCT/US2019/061133, dated Jun. 23, 2020.
(Continued)

*Primary Examiner* — Hung T Nguyen
(74) *Attorney, Agent, or Firm* — Harness, Dickey & Pierce, P.L.C.

(57) ABSTRACT

A method and system are disclosed and include obtaining image data from at least one camera located within a vehicle. The method also includes determining a behavior of an occupant based on the image data. The method also includes determining whether the behavior corresponds to a predetermined condition, which is associated with at least one of inhaling smoke, inhaling vapor, eating, and drinking. The method also includes generating, in response to the behavior corresponding to the predetermined condition, an alert corresponding to the predetermined condition. The method also includes transmitting the alert to a remote device.

14 Claims, 11 Drawing Sheets

(52) U.S. Cl.
CPC ............... *B60R 2022/4808* (2013.01); *B60R 2300/8006* (2013.01)

(58) Field of Classification Search
CPC ......... B60R 25/305; B60R 2300/8006; B60W 50/085
USPC ........ 340/424.5, 539.1, 539.11; 701/8, 9, 49
See application file for complete search history.

(56) References Cited

U.S. PATENT DOCUMENTS

| | | | |
|---|---|---|---|
| 2014/0129942 A1* | 5/2014 | Rathod | H04N 21/44222 715/720 |
| 2014/0222298 A1* | 8/2014 | Gurin | B60R 25/305 701/49 |
| 2014/0309862 A1 | 10/2014 | Ricci | |
| 2016/0001781 A1* | 1/2016 | Fung | G16H 50/20 701/36 |
| 2016/0364823 A1* | 12/2016 | Cao | G06Q 50/30 |
| 2017/0124831 A1 | 5/2017 | Li | |
| 2019/0168711 A1* | 6/2019 | Oesterling | B60R 25/1004 |

OTHER PUBLICATIONS

Written Opinion regarding International Application No. PCT/US2019/061133, dated Jun. 23, 2020.

* cited by examiner

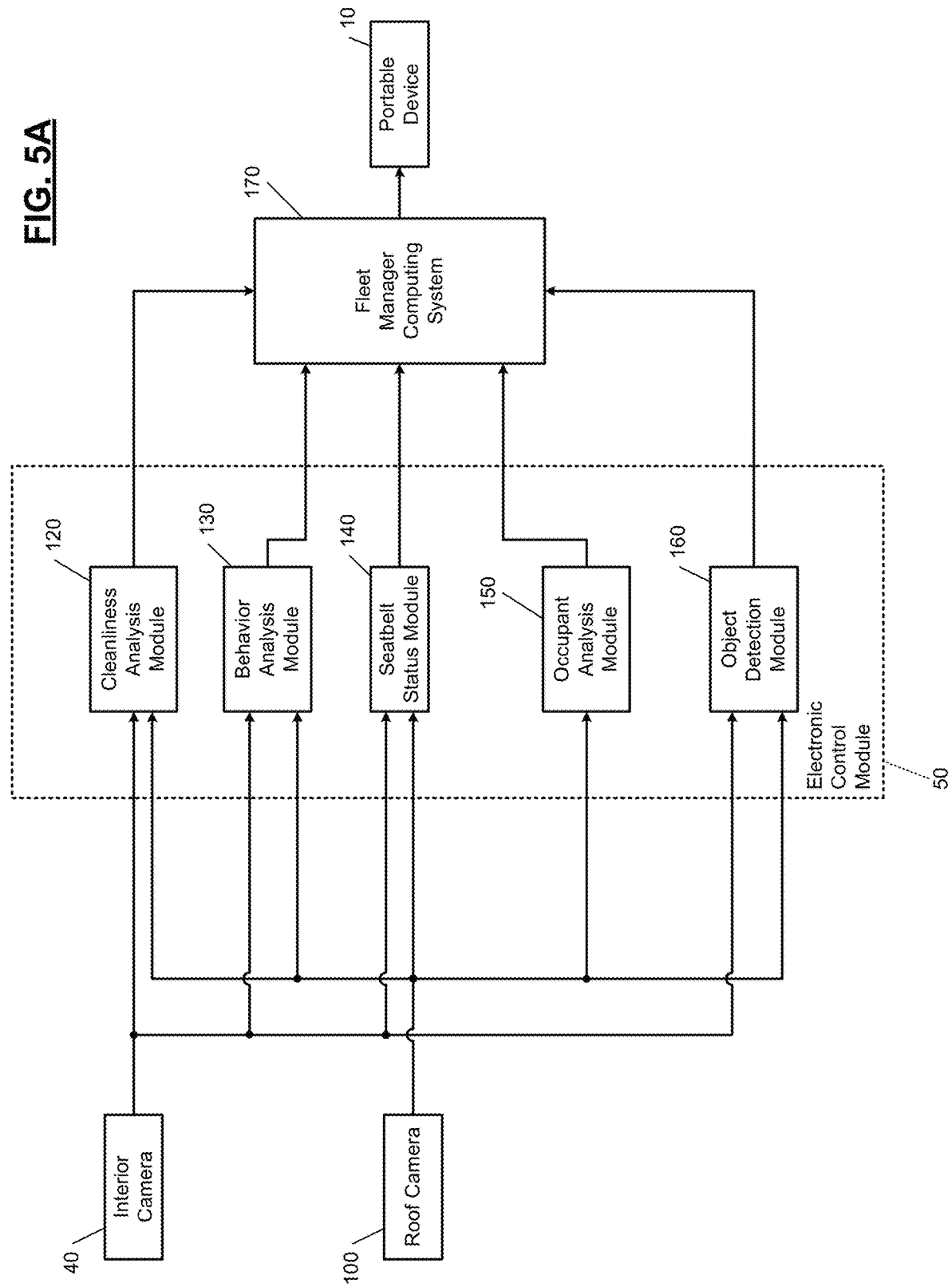

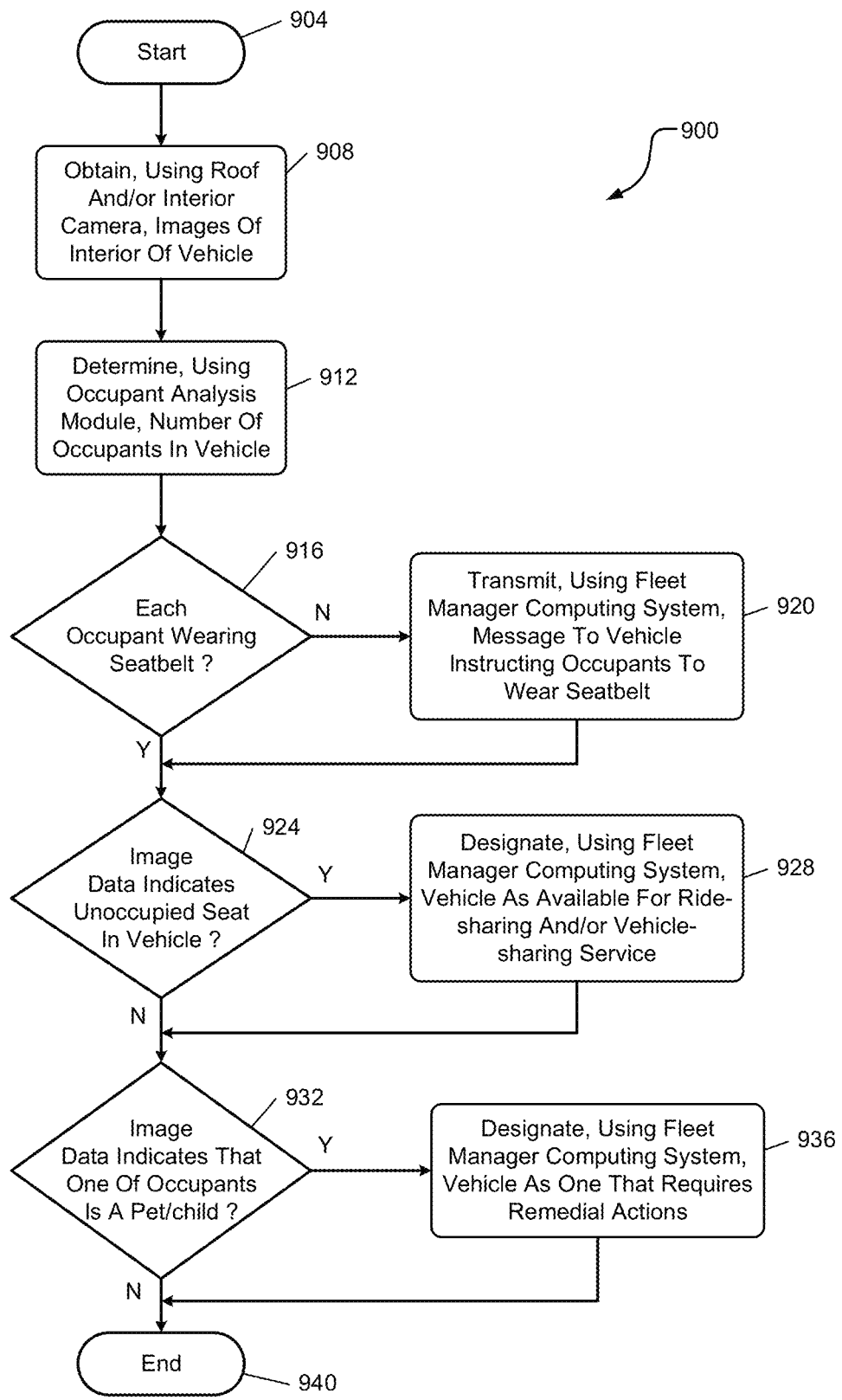

INTERIOR CAMERA SERVICES FOR VEHICLE-SHARING FLEET

CROSS-REFERENCE TO RELATED APPLICATIONS

This application claims the benefit of U.S. Provisional Application No. 62/760,613, filed on Nov. 13, 2018 and U.S. Provisional Application No. 62/812,049 filed on Feb. 28, 2019. The entire disclosures of each of the above applications are incorporated herein by reference.

FIELD

The present disclosure relates to interior camera services for a vehicle-sharing fleet.

BACKGROUND

This section provides background information related to the present disclosure and is not necessarily prior art.

Vehicle-sharing fleet managers may have a variety of vehicles that are available to rent for a predefined period of time, such as an hour, using a vehicle-sharing application. Similarly, ride-hailing and ride-sharing fleet managers may have a variety of vehicles that enable users to request a vehicle in order to travel to a specified destination. However, these vehicles lack sufficient and effective interior camera services.

SUMMARY

This section provides a general summary of the disclosure, and this section is not a comprehensive disclosure of its full scope or all of its features.

A method is disclosed and includes obtaining, using a processor configured to execute instructions stored in a nontransitory computer-readable medium, image data from at least one camera located within a vehicle. The method also includes determining, using the processor, a behavior of an occupant based on the image data. The method also includes determining, using the processor, whether the behavior corresponds to a predetermined condition, wherein the predetermined condition is associated with at least one of inhaling smoke, inhaling vapor, eating, and drinking. The method also includes generating, using the processor and in response to the behavior corresponding to the predetermined condition, an alert corresponding to the predetermined condition. The method also includes transmitting, using the processor, the alert to a remote device.

In some embodiments, determining the behavior of the occupant based on the image data further comprises determining, using the processor, movement information associated with the occupant based on the image data.

In some embodiments, determining whether the behavior corresponds to the predetermined condition further comprises determining, using the processor, whether the movement information indicates that the occupant is inhaling smoke, inhaling vapor, eating, or drinking.

In some embodiments, the alert is configured to indicate that the vehicle is unclean.

In some embodiments, the method further comprises determining, using the processor, a number of occupants within the vehicle; determining, using the processor and based on the number of occupants, whether the vehicle includes at least one unoccupied seat; and in response to determining that the vehicle includes at least one unoccupied seat, generating, using the processor, a second alert indicating that the vehicle is available for at least one of a vehicle-sharing service and a ride-hailing service.

In some embodiments, the method further comprises determining, using the processor, a characteristic of at least one occupant within the vehicle; determining, using the processor, whether the characteristic is associated with a group; and generating, using the processor and in response to the characteristic being associated with the group, a second alert indicating that the vehicle is unclean.

In some embodiments, the characteristic of the at least one occupant is one of a child and a pet.

In some embodiments, the predetermined condition is associated with a failure to use a seatbelt.

In some embodiments, the remote device is a smartphone associated with the occupant.

In some embodiments, the method further comprises obtaining, using the processor, a first set of image data from the at least one camera; obtaining, using the processor and in response to a vehicle-sharing session ending, a second set of image data; determining, using the processor and based on first set of image data and the second set of image data, whether the second set of image data indicates at least one of (i) the occupant leaving an object in the vehicle and (ii) a liquid being spilled while the occupant was in the vehicle; and generating, using the processor and in response to the second set of image data indicating at least one of (i) the occupant leaving the object in the vehicle and (ii) the liquid being spilled while the occupant was in the vehicle, a corresponding second alert.

A system is also disclosed and includes a processor configured to execute instructions stored in a nontransitory computer-readable medium. The instructions include obtaining image data from at least one camera located within a vehicle; determining a behavior of an occupant based on the image data; and determining whether the behavior corresponds to a predetermined condition, wherein the predetermined condition is associated with at least one of inhaling smoke, inhaling vapor, eating, and drinking. The instructions also include, in response to the behavior corresponding to the predetermined condition, generating an alert corresponding to the predetermined condition; and transmitting the alert to a remote device.

In some embodiments, determining the behavior of the occupant based on the image data further comprises determining movement information associated with the occupant based on the image data.

In some embodiments, determining whether the behavior corresponds to the predetermined condition further comprises determining whether the movement information indicates that the occupant is inhaling smoke, inhaling vapor, eating, or drinking.

In some embodiments, the alert is configured to indicate that the vehicle is unclean.

In some embodiments, the instructions further comprise determining a number of occupants within the vehicle; determining whether the vehicle includes at least one unoccupied seat based on the number of occupants; and in response to determining that the vehicle includes at least one unoccupied seat, generating a second alert indicating that the vehicle is available for at least one of a vehicle-sharing service and a ride-hailing service.

In some embodiments, the instructions further comprise determining a characteristic of at least one occupant within the vehicle; determining whether the characteristic is associated with a group; and in response to the characteristic being associated with the group, generating a second alert indicating that the vehicle is unclean.

In some embodiments, the characteristic of the at least one occupant is one of a child and a pet.

In some embodiments, the predetermined condition is associated with a failure to use a seatbelt.

In some embodiments, the remote device is a smartphone associated with the occupant.

In some embodiments, the instructions further comprise obtaining a first set of image data from the at least one camera; in response to a vehicle-sharing session ending, obtaining a second set of image data; determining, based on first set of image data and the second set of image data, whether the second set of image data indicates at least one of (i) the occupant leaving an object in the vehicle and (ii) a liquid being spilled while the occupant was in the vehicle; and in response to the second set of image data indicating at least one of (i) the occupant leaving the object in the vehicle and (ii) the liquid being spilled while the occupant was in the vehicle, generating a corresponding second alert.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIGS. 5A-5B illustrate a detailed example functional block diagram of an electronic control module of the vehicle according to the present disclosure.

FIGS. 7-9 illustrate example control algorithms according to the present disclosure.

Corresponding reference numerals indicate corresponding parts throughout the several views of the drawings.

DETAILED DESCRIPTION

Figure 1:
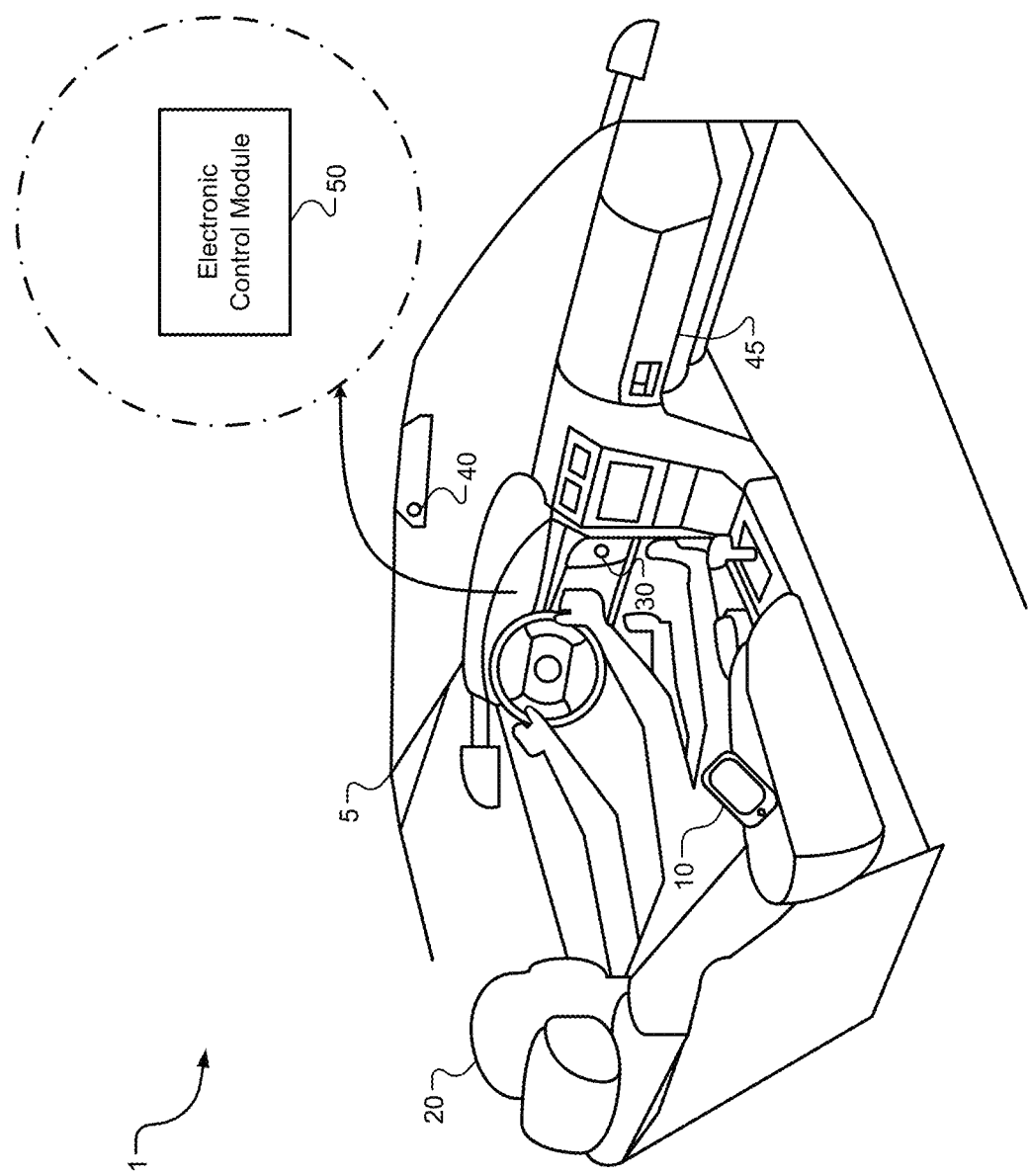
FIGS. 1-4 are example diagrams of a vehicle according to the present disclosure.

Example embodiments will now be described more fully with reference to the accompanying drawings.

With reference to FIGS. 1-4, example illustrations of a system 1 are shown. The system 1 may include a vehicle 5, a portable device 10, an ignition switch 30, an interior camera 40, and a storage compartment 45. In one embodiment, the vehicle 5 is part of a vehicle-sharing fleet. Additionally or alternatively, the vehicle 5 may be part of a ride-sharing fleet and/or a ride-hailing fleet.

The vehicle 5 may include an electronic control module (ECM) 50. As an example, the ECM 50 may be located behind a dashboard 48 of the vehicle 5. While one interior camera 40 is shown in this example, any number of interior cameras 40 can be included within the vehicle 5. Moreover, while the interior camera 40 is located on a rear-view mirror in FIG. 1, the interior camera 40 may be positioned at any suitable location within the interior of the vehicle 5.

The portable device 10 may be any device that is configured to transmit and receive wireless signals, such as a smartphone, smartwatch, wearable electronic device, key fob, tablet device, laptop device, a Bluetooth-enabled device, or other device associated with a user 20 and capable of wireless communication. As described below in further detail, the portable device 10 is configured to generate vehicle-sharing requests and define personalized vehicle settings via an application executing on the portable device 10. Furthermore, the portable device 10 is configured to receive a digital key associated with the vehicle 5 from a fleet manager computing system (shown below) in response to transmitting the vehicle-sharing request. The digital key enables the user 20 to unlock and enter the vehicle 5. Accordingly, the portable device 10 may include at least one processor that is configured to execute instructions stored in a nontransitory computer-readable medium, such as a random-access memory (RAM) and/or a read-only memory (ROM).

The interior camera 40 may be configured to obtain image data of the user 20. Based on the image data obtained by the interior camera 40, the ECM 50 is configured to execute a behavior analysis algorithm, as described below in further detail with reference to FIG. 8. Additionally, the ECM 50 may be configured to authenticate the user 20 based on the obtained image data and a vehicle-sharing account associated with the user 20. In order to carry out the functionality of algorithms described herein, the ECM 50 may include at least one processor that is configured to execute instructions stored in a nontransitory computer-readable medium, such as a RAM and/or ROM. The ECM 50 may be in communication with the interior camera 40 via a hardware link, such as a local interconnect network (LIN) cable, a controller area network (CAN) cable, an Ethernet cable, or any other suitable hardwire link. In other embodiments, the ECM 50 may be in communication with the interior camera 40 via any suitable telemetric link, such as a Bluetooth link (e.g., Bluetooth low-energy), a Wi-Fi or Wi-Fi direct link, a cellular link, etc. Likewise, the ECM 50 may be in communication with the portable device 10 via any suitable telemetric link, such as a Bluetooth link (e.g., Bluetooth low-energy), a Wi-Fi or Wi-Fi direct link, a cellular/LTE link, etc.

In response to the ECM 50 authenticating the user 20, the ECM 50 may enable the user 20 to activate the vehicle 5. As an example, the ECM 50 may enable the user 20 to retrieve keys stored in the storage compartment 45 (e.g., glove box) of the vehicle 5 for subsequent placement and rotation of the ignition switch 30. Alternatively, the ignition switch 30 may be implemented by a button, and as such, the vehicle 5 may be activated in response to pressing the button and the portable device 10 being located within an activation range of the vehicle 5. Additionally, in response to the ECM 50 authenticating the user 20, the ECM 50 may adjust various vehicle settings according to the vehicle-sharing account associated with the user 20.

Figure 2:
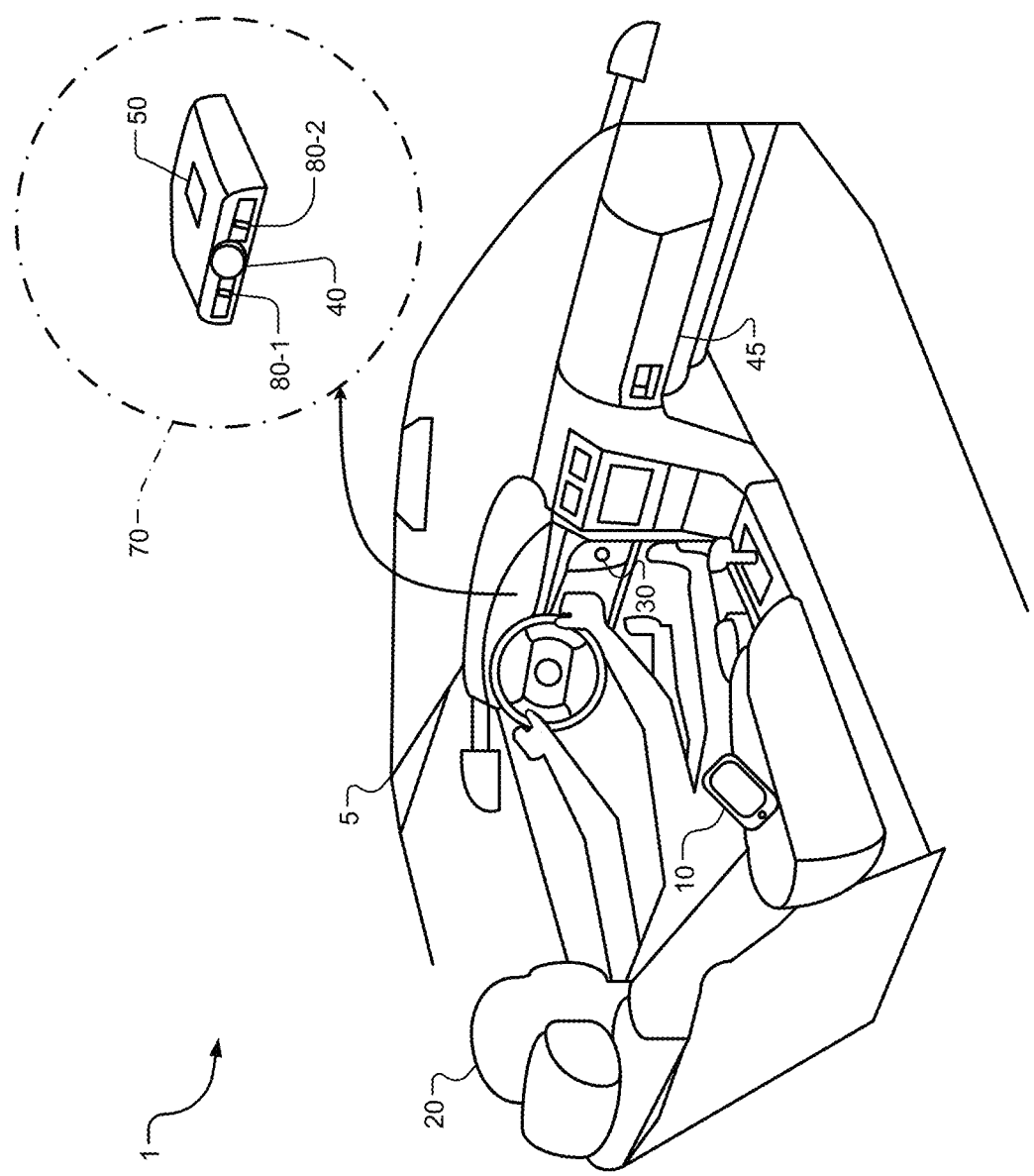

In other embodiments and as shown in FIG. 2, the dashboard 48 may also include a driver status monitor (DSM) 70, which may be mounted over a steering column connected to the steering wheel of the vehicle 5. The DSM 70 may include infrared (IR) sensors 80-1, 80-2 (collectively referred to as IR sensors 80), the interior camera 40, and the ECM 50. The DSM 70 may be configured to obtain facial feature data of the user 20. As an example, the ECM 50 may obtain facial feature data sensed by the IR sensors 80 and the interior camera 40, including images of the face and head of the user 20. Based on the facial feature data, the ECM 50 is configured to, for example, execute the driver authentication algorithm by performing a variety of image processing and/or computer vision techniques for facial recognition, as understood by one of ordinary skill in the art.

While the embodiments shown in FIGS. 1-2 include one interior camera 40, in other embodiments, any number of interior cameras 40 may be included within the vehicle 5. Moreover, while the interior camera 40 is included on a rear-view mirror in FIG. 1 and the DSM 70 in FIG. 2, the interior camera 40 may be positioned at any suitable location of the interior of the vehicle 5.

Figure 3:
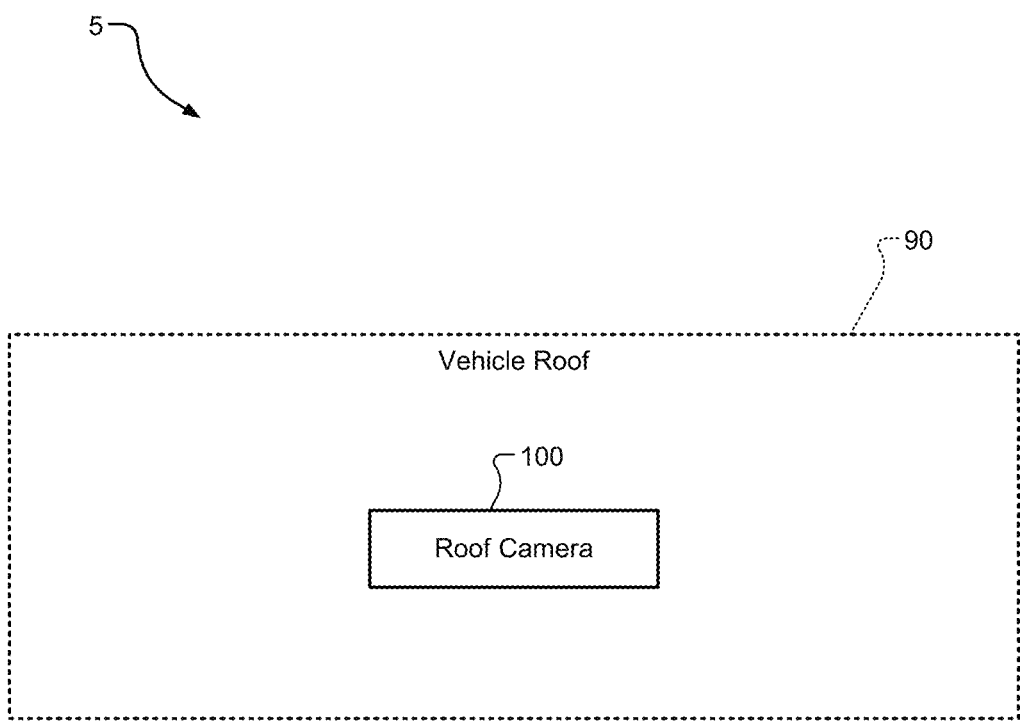

Additionally, a vehicle roof 90 (e.g., a headliner) of the vehicle 5 may include a roof camera 100, as shown in FIG. 3. While this embodiment illustrates one roof camera 100, in other embodiments, any number of roof cameras 100 may be included on the vehicle roof 90. The roof camera 100 is configured to obtain image data representing the interior of the vehicle 5. Based on the image data obtained by the roof camera 100, the ECM 50 is configured to execute, for example, an object detection algorithm (shown below in FIGS. 6-7), the behavior analysis algorithm (shown below in FIG. 8), and an occupant analysis algorithm (shown below in FIG. 9). The ECM 50 may be in communication with the roof camera 100 via a hardware link, such as a LIN cable, an Ethernet cable, or any other suitable hardwire link. In other embodiments, the ECM 50 may be in communication with the roof camera 100 via any suitable telemetric link, such as a Bluetooth link (e.g., Bluetooth low-energy), a Wi-Fi or Wi-Fi direct link, a cellular link, etc.

Figure 4:
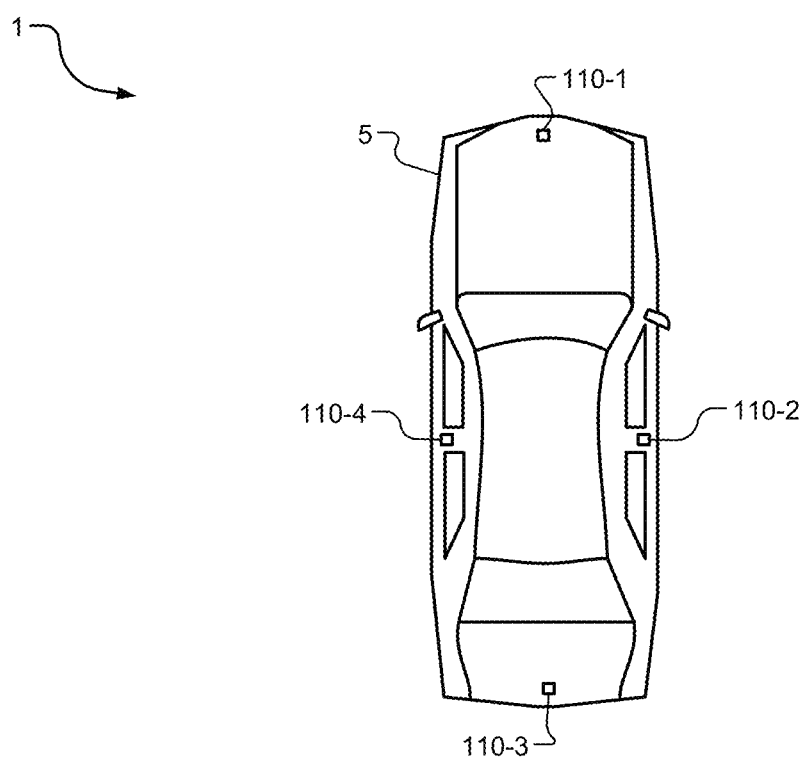

Additionally, the vehicle 5 may include a plurality of exterior cameras 110-1, 110-2, 110-3, 110-4 (collectively referred to as exterior cameras 110), as shown in FIG. 4. While this embodiment illustrates four exterior cameras 110, in other embodiments, the vehicle 5 may include any number of exterior cameras 110, and the exterior cameras 110 may be located at any suitable location on an exterior of the vehicle 5. The ECM 50 may be in communication with the exterior cameras 110 via a hardware link, such as a LIN cable, a CAN cable, an Ethernet cable, or any other suitable hardwire link. In other embodiments, the ECM 50 may be in communication with the exterior cameras 110 via any suitable telemetric link, such as a Bluetooth link (e.g., Bluetooth low-energy), a Wi-Fi or Wi-Fi direct link, a cellular link, etc.

Figure 5B:
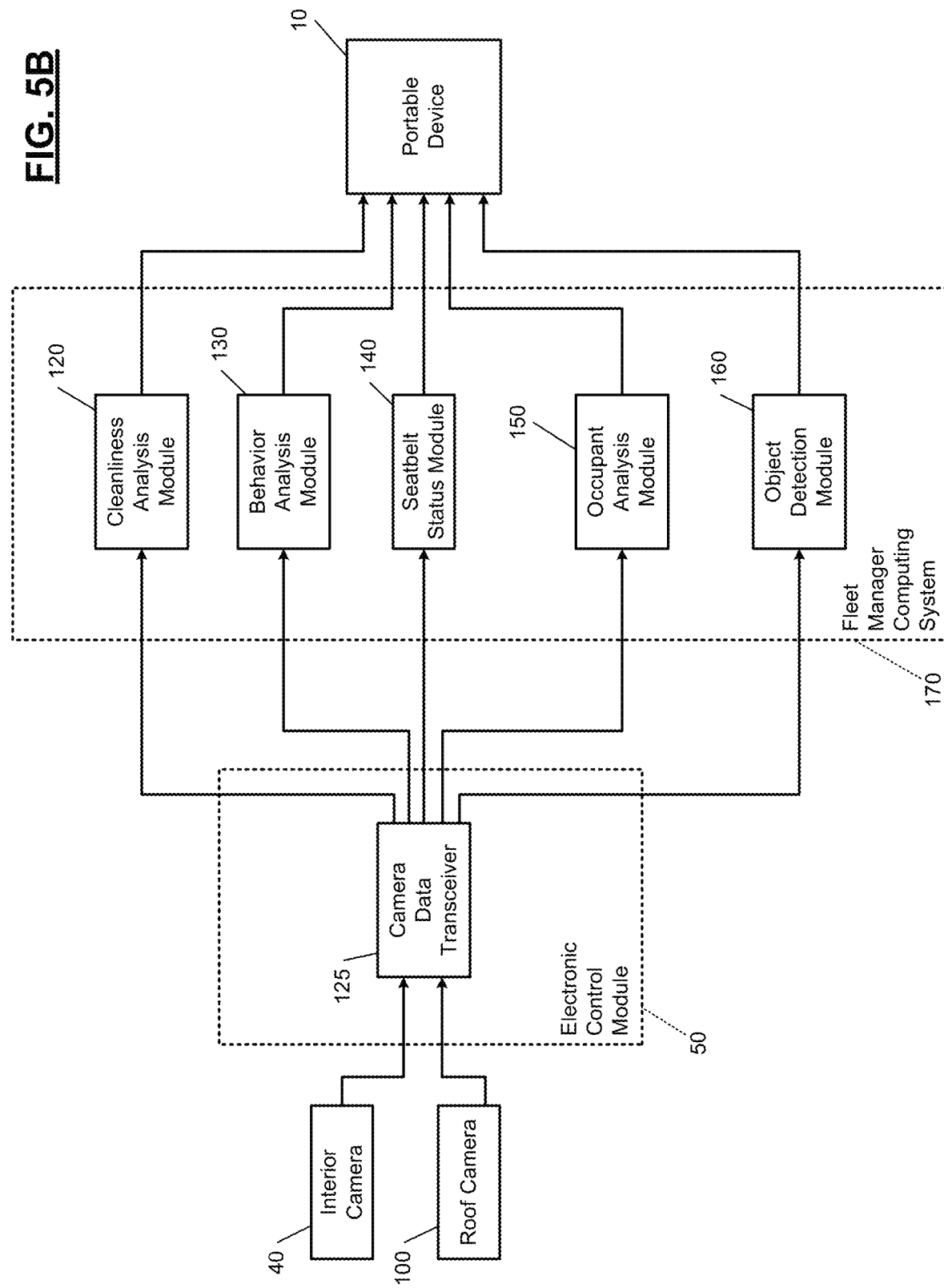

With reference to FIG. 5A, a detailed illustration of the ECM 50 is shown. The ECM 50 may include a cleanliness analysis module 120, a behavior analysis module 130, a seatbelt status module 140, an occupant analysis module 150, and an object detection module 160. The modules of the ECM 50 may be implemented by one or more processors that are configured to execute instructions stored in a nontransitory computer-readable medium, such as a RAM and/or ROM. In other embodiments, the cleanliness analysis module 120, the behavior analysis module 130, the seatbelt status module 140, the occupant analysis module 150, and the object detection module 160 may be included as part of a fleet manager computing system 170 that is configured to receive data from the interior camera 40 and the roof camera 100 via a camera data transceiver 125 of the ECM 50, as shown in FIG. 5B. In order to carry out the functionality described herein, the fleet manager computing system 170 may include one or more processors that are configured to execute instructions stored in a nontransitory computer-readable medium, such as a RAM and/or ROM.

The cleanliness analysis module 120 is configured to determine whether the user 20 has performed an action during a vehicle-sharing event that has made the vehicle 5 dirty. As an example, once an unlock command has been transmitted by the ECM 50 to a lock control module (not shown), the cleanliness analysis module 120 obtains a first set of image data from the roof camera 100 and/or the interior camera 40. Once the user 20 has completed a vehicle-sharing session or exited the vehicle 5, the cleanliness analysis module 120 obtains a second set of image data from the roof camera 100 and/or interior camera 40.

The cleanliness analysis module 120 may then compare the first set of image data to the second set of image data in order to determine whether, for example, the user 20 has spilled a drink in the vehicle 5 or has left trash in the vehicle 5. In one embodiment, the cleanliness analysis module 120 may evaluate differences between light intensity values of the first set of image data (e.g., light intensities of each pixel of the first set of image data) and light intensity values of the second set of image data (e.g., light intensities of each pixel of the second set of image data). If the differences between corresponding light intensity values differ by a predetermined amount (i.e., a light intensity value of a first group of pixels in the first set of image data differs from a light intensity value of a corresponding group of pixels in the second set of image data), then the cleanliness analysis module 120 may determine that the user 20 has spilled a drink or left trash in the vehicle 5. Additionally or alternatively, the cleanliness analysis module 120 may determine that the user 20 has spilled a drink of left trash in the vehicle 5 using machine learning algorithms or other similar algorithms. The cleanliness analysis module 120 is described below in further detail with reference to FIG. 7.

Furthermore, if the cleanliness analysis module 120 determines that the user 20 has spilled a drink or left trash in the vehicle 5, an operator of the fleet manager computing system 170 may remotely activate the interior camera 40 and/or the roof camera 100 in order to manually inspect the interior of the vehicle 5.

The behavior analysis module 130 is configured to generate cleaning alerts based on the image data retrieved from the interior camera 40 and/or the roof camera 100. As an example, the interior camera 40 and/or roof camera 100 may obtain image data while the user 20 inside of and/or operating the vehicle 5. If the behavior analysis module 130 determines that the image data indicates the user 20 is, for example, smoking, inhaling vapor (i.e., an e-cigarette or vaporizer), eating, or drinking, the behavior analysis module 130 may generate a corresponding alert, and in response to generating the alert, the fleet manager computing system 170 and/or an operator thereof may subsequently take remedial actions. Example remedial actions may include transmitting a message to the portable device 10, wherein the message alerts the user 20 of the particular activity and/or requests the user 20 to cease the particular activity. The behavior analysis module 130 is described below in further detail with reference to FIG. 8.

The seatbelt status module 140 is configured to determine whether the user 20 and/or other occupants of the vehicle 5 are wearing a seatbelt. As an example, the interior camera 40 and/or roof camera 100 may obtain image data when the user 20 and/or other occupants are in the vehicle 5 and/or operating the vehicle 5. If the seatbelt status module 140 indicates that the user 20 and/or other occupants are not wearing a seatbelt, the seatbelt status module 140 may generate a corresponding alert. In response to generating the alert, the fleet manager computing system 170 and/or an operator thereof may subsequently take remedial actions. Example remedial actions may include transmitting a message to the portable device 10, wherein the message requests the user 20 and/or other occupants of the vehicle 5 to wear a seatbelt. The seatbelt status module 140 is described below in further detail with reference to FIG. 9.

The occupant analysis module 150 is configured to determine various characteristics of the user 20 and/or other occupants of the vehicle 5 based on the image data obtained from the roof camera 100. As an example, the occupant analysis module 150 may be configured to determine a number of occupants within the vehicle 5 and an occupant type for each occupant. The occupant analysis module 150 may be configured to determine the occupant type by executing, for example, machine learning algorithms or other similar algorithms. The occupant analysis module 150 is described below in further detail with reference to FIG. 9.

The object detection module 160 is configured to execute the object detection algorithm described below with reference to FIG. 6. In one embodiment, the object detection module 160 obtains image data from the roof camera 100. Additionally or alternatively, the object detection module 160 may obtain image data from the interior camera 40. Once the unlock command has been transmitted by the ECM 50 to the lock control module (not shown), the object detection module 160 obtains a first set of image data from the roof camera 100. Once the user 20 has completed a vehicle-sharing session or exited the vehicle 5, the cleanliness analysis module 120 obtains a second set of image data from the roof camera 100.

The object detection module 160 may then compare the first set of image data to the second set of image data in order to determine whether, for example, the user 20 left a personal item in the vehicle 5. In one embodiment, the object detection module 160 may evaluate differences between light intensity values of the first set of image data (e.g., light intensities of each pixel of the first set of image data) and light intensity values of the second set of image data (e.g., light intensities of each pixel of the second set of image data). If the differences between corresponding light intensity values differ by a predetermined amount (i.e., a light intensity value of a first group of pixels in the first set of image data differs from a light intensity value of a corresponding group of pixels in the second set of image data), then the object detection module 160 may determine that an object was left behind. Additionally or alternatively, the object detection module 160 may determine that the object was left in the vehicle 5 and a type of object indicated by the second set of image data by executing, for example, machine learning algorithms or other similar algorithms. The object detection module 160 is described below in further detail with reference to FIG. 6A.

Figure 6A:
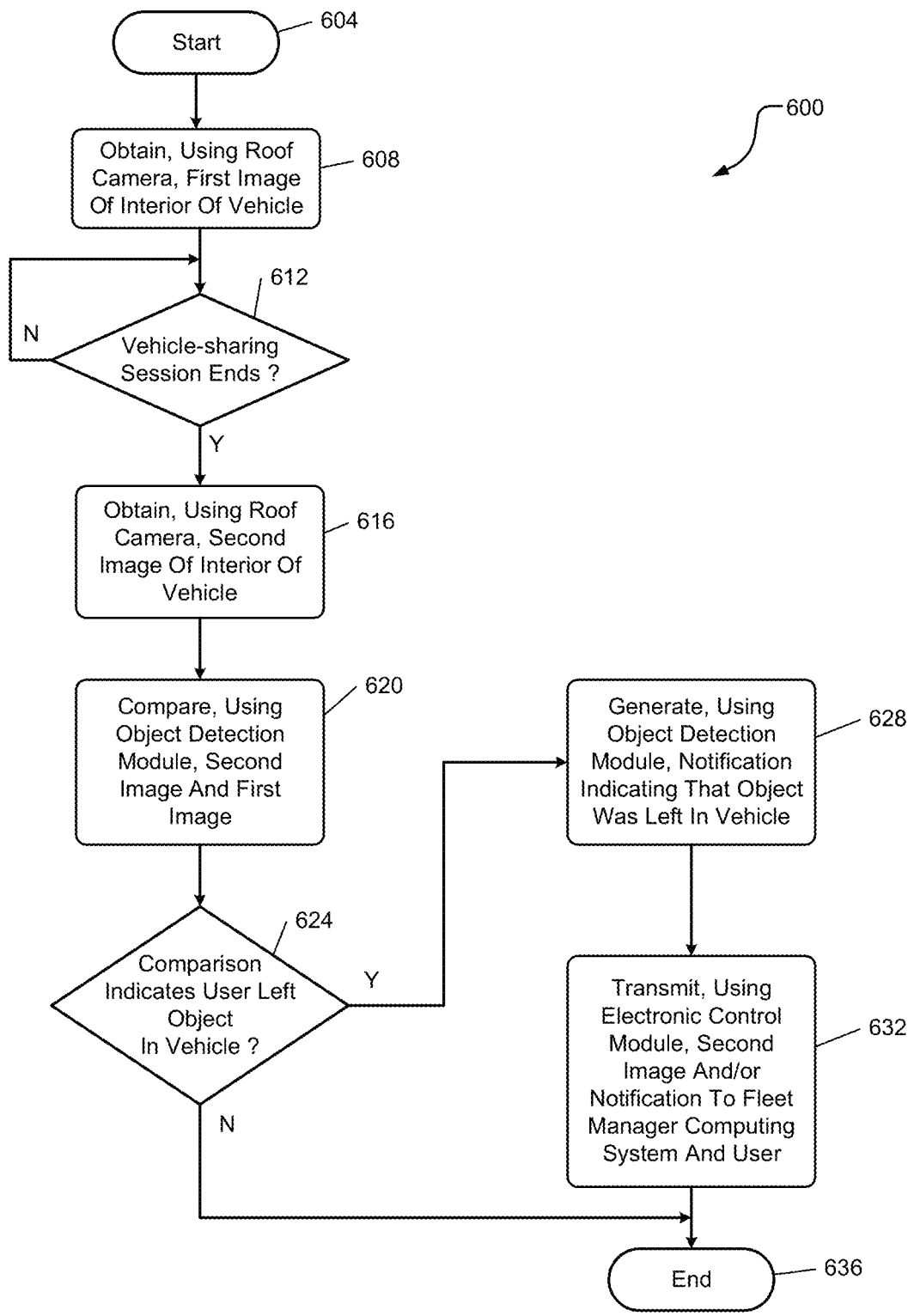
FIG. 6A illustrates an example control algorithm according to the present disclosure.
Figure 6B:
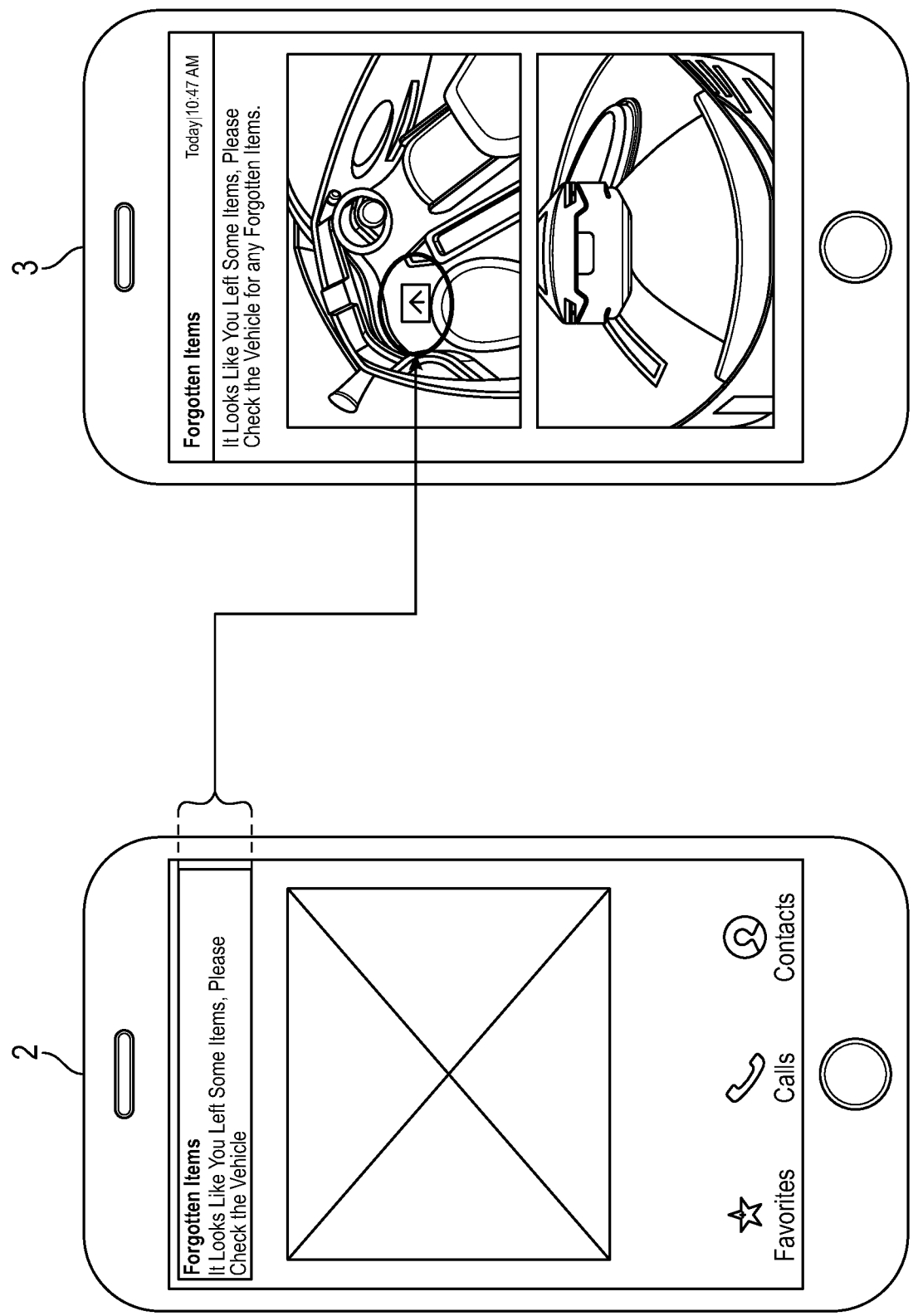
FIG. 6B illustrates an example notification of an object detection algorithm according to the present disclosure.

With reference to FIG. 6A, a flowchart illustrating a control algorithm 600 for performing object detection is shown. The control algorithm 600 begins at 604 when, for example, the user 20 has made a vehicle-sharing request and the unlock command has been transmitted by the ECM 50. At 608, the control algorithm 600 obtains, using the roof camera 100, a first image of the interior of the vehicle 5. At 612, the control algorithm 600 determines whether the vehicle-sharing session has ended. If so, the control algorithm 600 proceeds to 616; otherwise, the control algorithm 600 remains at 612.

At 616, the control algorithm 600 obtains, using the roof camera 100, a second image of the interior of the vehicle 5. At 620, the control algorithm 600 compares, using the object detection module 160, the second image and the first image. As an example, the object detection module 160 of the ECM 50 may evaluate differences between light intensity values of the first images (e.g., light intensities of each pixel of the first image) and light intensity values of the second image (e.g., light intensities of each pixel of the second image). At 624, the control algorithm 600 determines whether the comparison indicates that the user 20 left an object in the vehicle 5. As an example, the object detection module 160 may determine that the user 20 left an object in the vehicle 5 if the differences between corresponding light intensity values differ by a predetermined amount. If the comparison indicates an object was left in the vehicle 5, the control algorithm 600 proceeds to 628; otherwise, the control algorithm 600 proceeds to 636.

At 628, the control algorithm 600 generates, using the object detection module 160, a notification indicating that an object was left in the vehicle 5. At 632, the control algorithm 600 transmits, using the ECM 50, the second image and/or a notification to the fleet manager computing system 170 and/or the user 20, as shown in screenshot 2 and screenshot 3 of FIG. 6B, and then ends at 636.

Figure 7:
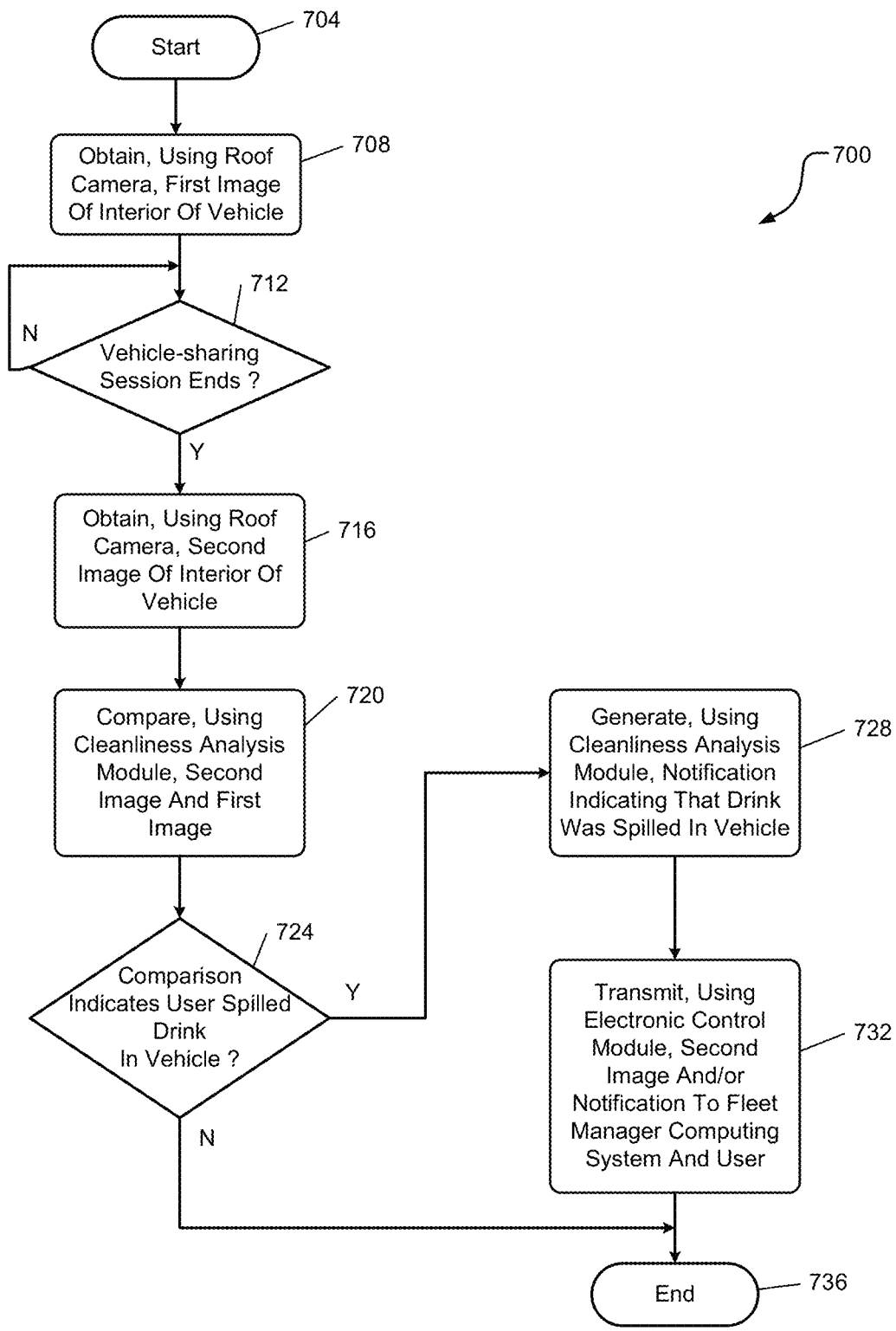

With reference to FIG. 7, a flowchart illustrating a control algorithm 700 for performing an example cleanliness analysis algorithm is shown. The control algorithm 700 begins at 704 when, for example, the user 20 has made a vehicle-sharing request and the unlock command has been transmitted by the ECM 50 to the lock control module. At 708, the control algorithm 700 obtains, using the roof camera 100, a first image of the interior of the vehicle 5. At 712, the control algorithm 700 determines whether the vehicle-sharing session has ended. If so, the control algorithm 700 proceeds to 716; otherwise, the control algorithm 700 remains at 712.

At 716, the control algorithm 700 obtains, using the roof camera 100, a second image of the interior of the vehicle 5. At 720, the control algorithm 700 compares, using the cleanliness analysis module 120, the second image and the first image. As an example, the cleanliness analysis module 120 may evaluate differences between light intensity values of the first images (e.g., light intensities of each pixel of the first image) and light intensity values of the second image (e.g., light intensities of each pixel of the second image). At 724, the control algorithm 700 determines whether the comparison indicates that the user 20 has spilled a drink in the vehicle 5. As an example, the cleanliness analysis module 120 may determine that the user 20 spilled a drink in the vehicle 5 if the differences between corresponding light intensity values differ by a predetermined amount. If the comparison indicates a drink was spilled in the vehicle 5, the control algorithm 700 proceeds to 728; otherwise, the control algorithm 700 proceeds to 736.

At 728, the control algorithm 700 generates, using the cleanliness analysis module 120, a notification indicating that a drink was spilled in the vehicle 5. At 732, the control algorithm 700 transmits, using the ECM 50, the second image and/or the notification to the fleet manager computing system 170 and the user 20 and then ends at 736.

Figure 8:
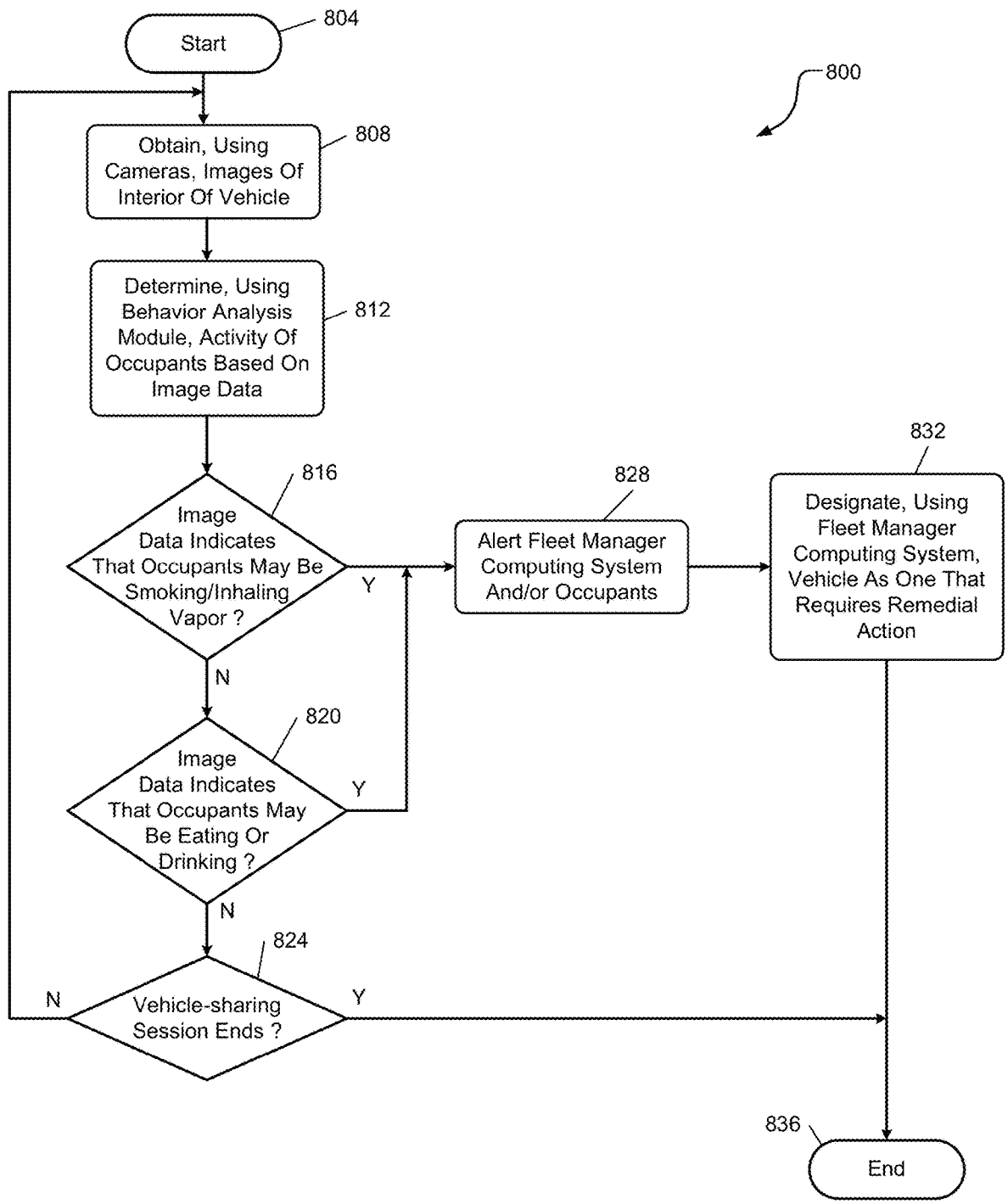

With reference to FIG. 8, a flowchart illustrating a control algorithm 800 for performing an example behavior analysis algorithm is shown. The control algorithm 800 begins at 804 when, for example, the user 20 turns on the vehicle 5. At 808, the control algorithm 800 obtains, using the roof camera 100 and/or interior camera 40, image data of the interior of the vehicle 5 and, more particularly, the user 20 and/or other occupants of the vehicle 5. At 812, the control algorithm 800 determines, using the behavior analysis module 130, the activity of the occupants based on the image data. As an example, the behavior analysis module 130 may be configured to determine the types of movement of the occupants based on the image data. Moreover, the behavior analysis module 130 may determine the activity of the occupants based on the types of movement. As a specific example, the behavior analysis module 130 may determine that the user 20 is smoking or inhaling a vapor if the image data indicates that the user 20 is repeatedly moving his or her hand (or certain fingers of the user's hand) from an armrest of the vehicle 5 to the user's mouth. As another specific example, the behavior analysis module 130 may determine that the user 20 is eating if the image data indicates that the user 20 is moving an object toward the user's mouth and while the object is near the user's mouth, the image data indicates that the movement of the user's mouth corresponds to eating food. Additionally, the behavior analysis module 130 may determine that the user 20 is drinking if the image data indicates that the user 20 is moving an object toward the user's mouth and while the object is near the user's mouth, the image data indicates that the movement of the user's head, cheeks, and/or neck corresponds to drinking a liquid. The behavior analysis module 130 may be configured to determine the occupant's behavior by executing, for example, machine learning algorithms or other similar algorithms.

At 816, the control algorithm 800 determines, using the behavior analysis module 130, whether the image data indicates that the occupants may be smoking or inhaling a vapor. If so, the control algorithm 800 proceeds to 828; otherwise, the control algorithm 800 proceeds to 820. At 820, the control algorithm 800 determines, using the behavior analysis module 130, whether the image data indicates that the occupants may be eating or drinking. If so, the control algorithm 800 proceeds to 828; otherwise, the control algorithm 800 proceeds to 824. At 824, the control algorithm 800 determines whether the vehicle-sharing session has ended. If so, the control algorithm 800 proceeds to 836; otherwise, the control algorithm 800 proceeds to 808.

At 828, the control algorithm 800 alerts the fleet manager computing system 170 and/or occupants of the vehicle 5 of the potential unauthorized and/or unclean activity. As an example, the behavior analysis module 130 may generate an alert corresponding to the identified unauthorized and/or unclean activity. Furthermore, in response to the behavior analysis module 130 generating the alert, the fleet manager computing system 170 may transmit a message based on the alert to the ECM 50 of the vehicle 5 and/or the portable device 10 associated with the user 20.

At 832, the control algorithm 800 designates, using the fleet manager computing system 170, the vehicle 5 as one that requires remedial actions. As an example, if the alert corresponds to smoking, inhaling a vapor, or eating, the fleet manager computing system 170 may designate the vehicle 5 as one that needs to be cleaned after the vehicle-sharing session is completed and prior to any future vehicle-sharing sessions. As another example, if the alert corresponds to drinking a liquid, the fleet manager computing system 170 may designate the vehicle 5 as one that needs to be remotely inspected by an operator after the vehicle-sharing session is completed and prior to any future vehicle-sharing sessions. The operator may remotely inspect the vehicle 5 by activating the interior camera 40 and/or the roof camera 100, and based on the remote inspection, the operator may further designate the vehicle 5 as one that needs to be cleaned after the vehicle-sharing session is completed and prior to any future vehicle-sharing sessions. At 836, the control algorithm 800 ends.

With reference to FIG. 9, a flowchart illustrating a control algorithm 900 for performing occupant detection and seatbelt status algorithms is shown. The control algorithm 900 begins at 904 when, for example, the user 20 turns on the vehicle 5. At 908, the control algorithm 900 obtains, using the roof camera 100 and/or interior camera 40, image data of the interior of the vehicle 5. At 912, the control algorithm 900 determines, using the occupant analysis module 150, the number of occupants in the vehicle 5 based on the image data and using, for example, machine learning algorithms or other similar algorithms. At 916, the control algorithm 900 determines, using the seatbelt status module 140, whether each occupant is wearing a seatbelt by using machine learning or other similar algorithms. If so, the control algorithm 900 proceeds to 924; otherwise, the control algorithm 900 proceeds to 920, wherein the control algorithm 900 transmits, using the fleet manager computing system 170, a message to the ECM 50 of the vehicle 5 and/or the portable device 10 that causes a display of the vehicle 5 and/or the portable device 10 to instruct the respective occupants to wear their seatbelts.

At 924, the control algorithm 900 determines, using the occupant analysis module 150, whether the image data indicates an unoccupied seat in the vehicle 5. If so, the control algorithm 900 proceeds to 928, wherein the control algorithm 900 designates, using the fleet manager computing system 170, the vehicle 5 as available for ride-sharing and/or vehicle-sharing services; otherwise, the control algorithm 900 proceeds to 932. At 932, the control algorithm 900 determines, using the occupant analysis module 150, whether the image data indicates that one of the occupants is a pet or a young child. If so, the control algorithm 900 proceeds to 936; otherwise, the control algorithm 900 proceeds to 940. At 936, the control algorithm 900 designates, using the fleet manager computing system 170, the vehicle 5 as one that requires a remedial action, such as one that needs to be cleaned after the vehicle-sharing session is completed and prior to any future vehicle-sharing sessions. At 940, the control algorithm 900 ends.

The present disclosure provides a method that includes obtaining, using a processor configured to execute instructions stored in a nontransitory computer-readable medium, image data from at least one camera located within a vehicle, determining, using the processor, a behavior of an occupant based on the image data, determining, using the processor, whether the behavior corresponds to a predetermined condition, wherein the predetermined condition is associated with at least one of inhaling smoke, inhaling vapor, eating, and drinking, generating, using the processor and in response to the behavior corresponding to the predetermined condition, an alert corresponding to the predetermined condition, and transmitting, using the processor, the alert to a remote device.

In other features, determining the behavior of the occupant based on the image data includes determining, using the processor, movement information associated with the occupant based on the image data.

In other features, determining whether the behavior corresponds to the predetermined condition further includes determining, using the processor, whether the movement information indicates that the occupant is inhaling smoke, inhaling vapor, eating, or drinking.

In other features, the alert is configured to indicate that the vehicle is unclean.

In other features, the method further includes determining, using the processor, a number of occupants within the vehicle, determining, using the processor and based on the number of occupants, whether the vehicle includes at least one unoccupied seat, and, in response to determining that the vehicle includes at least one unoccupied seat, generating, using the processor, a second alert indicating that the vehicle is available for at least one of a vehicle-sharing service and a ride-hailing service.

In other features, the method further includes determining, using the processor, a characteristic of at least one occupant within the vehicle, determining, using the processor, whether the characteristic is associated with a group, and generating, using the processor and in response to the characteristic being associated with the group, a second alert indicating that the vehicle is unclean.

In other features, the characteristic of the at least one occupant is one of a child and a pet.

In other features the predetermined condition is associated with a failure to use a seatbelt.

In other features, the remote device is a smartphone associated with the occupant.

In other features, the method further includes obtaining, using the processor, a first set of image data from the at least one camera, obtaining, using the processor and in response to a vehicle-sharing session ending, a second set of image data, determining, using the processor and based on first set of image data and the second set of image data, whether the second set of image data indicates at least one of (i) the occupant leaving an object in the vehicle and (ii) a liquid being spilled while the occupant was in the vehicle, and generating, using the processor and in response to the second set of image data indicating at least one of (i) the occupant leaving the object in the vehicle and (ii) the liquid being spilled while the occupant was in the vehicle, a corresponding second alert.

The present disclosure also provides a system that includes a processor configured to execute instructions stored in a nontransitory computer-readable medium. The instructions include obtaining image data from at least one camera located within a vehicle, determining a behavior of an occupant based on the image data, determining whether the behavior corresponds to a predetermined condition, wherein the predetermined condition is associated with at least one of inhaling smoke, inhaling vapor, eating, and drinking, in response to the behavior corresponding to the predetermined condition, generating an alert corresponding to the predetermined condition, and transmitting the alert to a remote device.

In other features, determining the behavior of the occupant based on the image data further includes determining movement information associated with the occupant based on the image data.

In other features, determining whether the behavior corresponds to the predetermined condition further includes determining whether the movement information indicates that the occupant is inhaling smoke, inhaling vapor, eating, or drinking.

In other features, the alert is configured to indicate that the vehicle is unclean.

In other features, the instructions further include determining a number of occupants within the vehicle, determining whether the vehicle includes at least one unoccupied seat based on the number of occupants, and in response to determining that the vehicle includes at least one unoccupied seat, generating a second alert indicating that the vehicle is available for at least one of a vehicle-sharing service and a ride-hailing service.

In other features, the instructions further include determining a characteristic of at least one occupant within the vehicle, determining whether the characteristic is associated with a group, and, in response to the characteristic being associated with the group, generating a second alert indicating that the vehicle is unclean.

In other features, the characteristic of the at least one occupant is one of a child and a pet.

In other features, the predetermined condition is associated with a failure to use a seatbelt.

In other features, the remote device is a smartphone associated with the occupant.

In other features, the instructions further include obtaining a first set of image data from the at least one camera, in response to a vehicle-sharing session ending, obtaining a second set of image data, determining, based on first set of image data and the second set of image data, whether the second set of image data indicates at least one of (i) the occupant leaving an object in the vehicle and (ii) a liquid being spilled while the occupant was in the vehicle, and, in response to the second set of image data indicating at least one of (i) the occupant leaving the object in the vehicle and (ii) the liquid being spilled while the occupant was in the vehicle, generating a corresponding second alert.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
obtaining, using a processor configured to execute instructions stored in a nontransitory computer-readable medium, image data from at least one camera located within a vehicle during a first vehicle-sharing session;
determining, using the processor, a behavior of a first occupant of the vehicle based on the image data;
determining, using the processor, whether the behavior corresponds to a predetermined condition, wherein the predetermined condition is associated with at least one of inhaling smoke, inhaling vapor, eating, and drinking;
generating, using the processor and in response to the behavior corresponding to the predetermined condition, a first alert corresponding to the predetermined condition;
transmitting, using the processor, the first alert to a remote device;
determining, using the processor, whether a second occupant of the vehicle is one of a child or a pet based on the image data obtained during the first vehicle-sharing session;
generating, using the processor, a second alert indicating that the vehicle needs to be cleaned after the first vehicle-sharing session and before a second vehicle-sharing session in response to determining that the second occupant of the vehicle is one of the child or the pet; and
transmitting, using the processor, the second alert to the remote device.

2. The method of claim 1, wherein determining the behavior of the occupant based on the image data further comprises:
   determining, using the processor, movement information associated with the occupant based on the image data.

3. The method of claim 2, wherein determining whether the behavior corresponds to the predetermined condition further comprises:
   determining, using the processor, whether the movement information indicates that the occupant is inhaling smoke, inhaling vapor, eating, or drinking.

4. The method of claim 1, wherein the first alert is configured to indicate that the vehicle is unclean.

5. The method of claim 1, further comprising:
   determining, using the processor, a number of occupants within the vehicle;
   determining, using the processor and based on the number of occupants, whether the vehicle includes at least one unoccupied seat; and
   in response to determining that the vehicle includes at least one unoccupied seat, generating, using the processor, a third alert indicating that the vehicle is available for at least one of a vehicle-sharing service and a ride-hailing service.

6. The method of claim 1, wherein the remote device is a smartphone associated with the occupant.

7. The method of claim 1, further comprising:
   obtaining, using the processor, a first set of image data from the at least one camera;
   obtaining, using the processor and in response to a vehicle-sharing session ending, a second set of image data;
   determining, using the processor and based on first set of image data and the second set of image data, whether the second set of image data indicates at least one of (i) the occupant leaving an object in the vehicle and (ii) a liquid being spilled while the occupant was in the vehicle; and
   generating, using the processor and in response to the second set of image data indicating at least one of (i) the occupant leaving the object in the vehicle and (ii) the liquid being spilled while the occupant was in the vehicle, a third alert.

8. A system comprising:
   a processor configured to execute instructions stored in a nontransitory computer-readable medium, wherein the instructions include:
   obtaining image data from at least one camera located within a vehicle during a first vehicle-sharing session;
   determining a behavior of a first occupant of the vehicle based on the image data;
   determining whether the behavior corresponds to a predetermined condition, wherein the predetermined condition is associated with at least one of inhaling smoke, inhaling vapor, eating, and drinking;
   in response to the behavior corresponding to the predetermined condition, generating a first alert corresponding to the predetermined condition;
   transmitting the first alert to a remote device;
   determining whether a second occupant of the vehicle is one of a child or a pet based on the image data obtained during the first vehicle-sharing session;
   generating a second alert indicating that the vehicle needs to be cleaned after the first vehicle-sharing session and before a second vehicle-sharing session in response to determining that the second occupant of the vehicle is one of the child or the pet; and
   transmitting the second alert to the remote device.

9. The system of claim 8, wherein determining the behavior of the occupant based on the image data further comprises:
   determining movement information associated with the occupant based on the image data.

10. The system of claim 9, wherein determining whether the behavior corresponds to the predetermined condition further comprises:
    determining whether the movement information indicates that the occupant is inhaling smoke, inhaling vapor, eating, or drinking.

11. The system of claim 8, wherein the first alert is configured to indicate that the vehicle is unclean.

12. The system of claim 8, wherein the instructions further comprise:
    determining a number of occupants within the vehicle;
    determining whether the vehicle includes at least one unoccupied seat based on the number of occupants; and
    in response to determining that the vehicle includes at least one unoccupied seat, generating a third alert indicating that the vehicle is available for at least one of a vehicle-sharing service and a ride-hailing service.

13. The system of claim 8, wherein the remote device is a smartphone associated with the occupant.

14. The system of claim 8, wherein the instructions further comprise:
    obtaining a first set of image data from the at least one camera;
    in response to a vehicle-sharing session ending, obtaining a second set of image data;
    determining, based on first set of image data and the second set of image data, whether the second set of image data indicates at least one of (i) the occupant leaving an object in the vehicle and (ii) a liquid being spilled while the occupant was in the vehicle; and
    in response to the second set of image data indicating at least one of (i) the occupant leaving the object in the vehicle and (ii) the liquid being spilled while the occupant was in the vehicle, generating a third alert.

* * * * *